United States Patent
Esdaile et al.

(10) Patent No.: US 9,194,020 B2
(45) Date of Patent: Nov. 24, 2015

(54) HEAP LEACHING

(75) Inventors: Lucy Esdaile, Carlton North (AU); Paul Leslie Brown, Kiama (AU)

(73) Assignee: Technological Resources Pty. Limited, Melbourne, Victoria (AU)

( * ) Notice: Subject to any disclaimer, the term of this patent is extended or adjusted under 35 U.S.C. 154(b) by 121 days.

(21) Appl. No.: 13/819,417

(22) PCT Filed: Sep. 5, 2011

(86) PCT No.: PCT/AU2011/001144
§ 371 (c)(1),
(2), (4) Date: Jun. 11, 2013

(87) PCT Pub. No.: WO2012/031317
PCT Pub. Date: Mar. 15, 2012

(65) Prior Publication Data
US 2013/0247719 A1    Sep. 26, 2013

(30) Foreign Application Priority Data
Sep. 6, 2010   (AU) ................................ 2010903996

(51) Int. Cl.
*C22B 3/02*   (2006.01)
*C22B 3/04*   (2006.01)

(52) U.S. Cl.
CPC .... *C22B 3/04* (2013.01); *C22B 3/02* (2013.01)

(58) Field of Classification Search
CPC .................................... C22B 3/04; C22B 3/02
See application file for complete search history.

(56) References Cited

U.S. PATENT DOCUMENTS

| 4,739,973 A | 4/1988 | Herndon |
| 5,030,279 A * | 7/1991 | Krauth ............................ 75/712 |
| 6,110,253 A * | 8/2000 | Kohr et al. ...................... 75/712 |
| 2005/0044990 A1* | 3/2005 | Shaw et al. ..................... 75/711 |
| 2006/0223154 A1 | 10/2006 | Kohr |
| 2008/0284068 A1 | 11/2008 | Castillo et al. |
| 2013/0106001 A1* | 5/2013 | Menacho ........................ 261/20 |

FOREIGN PATENT DOCUMENTS

| WO | 03038137 A1 | 5/2003 |
| WO | WO 2008139430 A2 * | 11/2008 ................ C22B 3/02 |
| WO | 2009000037 A1 | 12/2008 |

OTHER PUBLICATIONS

Derwent Acc No. 1987-284433 for the patent family including ZA 8609300 A by Blois et al published Jun. 1987. Abstract.*
International Search Report mailed Oct. 18, 2011 (PCT/AU2011/001144); ISA/AU.

* cited by examiner

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A heap of a material to be leached to recover a valuable metal from the material and a method of constructing the heap are disclosed. The heap comprises sides and a top and a system to control air flow into the heap. The air flow control system comprises a combination of an air impermeable barrier and an aeration system.

30 Claims, 4 Drawing Sheets

HEAP LEACHING

The present application is a U.S. National Phase filing of International Application No. PCT/AU2011/001144, filed on Sep. 5, 2011, designating the United States of America and claiming priority to Australian Patent Application No. 2010903996, filed Sep. 6, 2010, and the present application claims priority to and the benefit of all the above-identified applications, which are incorporated by reference herein in their entireties.

The present invention relates to leaching a material containing a valuable metal.

The present invention relates particularly, although by no means exclusively, to leaching a material in the form of a sulphidic ore containing a valuable metal.

The present invention relates particularly, although by no means exclusively, to leaching a sulphidic copper-containing ore that includes copper-containing minerals.

The present invention relates more particularly, although by no means exclusively, to leaching a sulphidic copper-containing ore that contains the copper-containing mineral chalcopyrite as a part of the ore.

The present invention relates more particularly, although by no means exclusively, to leaching a sulphidic copper-containing ore that includes a source of iron, such as in the form of pyrite, as a part of the ore.

In conventional heap and dump leaching of copper sulphide containing minerals, mined ore is stacked into heaps, aerated through direct injection of air via aeration pipes extending into the heap and/or by natural convection through exposed sides of the heap, irrigated with an acid solution for extraction of copper into solution, and the copper is subsequently recovered from solution by a range of recovery options including solvent extraction and electrowinning (SX/EW), cementation onto more active metals such as iron, hydrogen reduction, and direct electrowinning.

Generally, heap and dump leaching (hereinafter referred to as "heap leaching") provides lower metal recoveries than other metallurgical process options for recovering copper from copper-containing ores, such as milling and flotation that produces copper-containing concentrates that are then smelted to produce copper metal. Consequently, heap leaching tends to be reserved for low grade ore types that have at least a proportion of readily recovered copper, but where crushing/milling costs per unit of copper are too high to support a concentrator approach, or where mineral liberation and other characteristics (e.g. arsenic content) will not support production of directly useable or saleable concentrates.

The above description is not to be taken as an admission of the common general knowledge in Australia or elsewhere.

The applicant, through a group company, has carried out research and development work on heap leaching copper-containing ores and has made a number of findings in the course of the work. The present invention is an outcome of those findings.

The present invention provides a heap of a material to be leached to recover a valuable metal from the material, the heap comprising sides and a top and a system to control air flow into the heap, the air flow control system comprising:
  (a) an air impermeable barrier positioned on or forming a part of at least the sides of the heap to minimise or prevent altogether air flow into the heap through the sides, and
  (b) an aeration system to supply air to the heap as required during the course of a heap leaching operation.

The term "air impermeable" barrier is understood herein to mean that the barrier at least substantially prevents the movement of air through the barrier.

The air flow control system described above, i.e. the combination of the aeration system and the air impermeable barrier, makes it possible to control air flow into the heap as may be required during the course of a heap leaching operation on the heap. By way of example, it may be desirable to vary the air flow during different stages of the heap leaching operation, with the air flow requirements varying between low flow rates (which could be regarded as "anaerobic" conditions) and high flow rates (which could be regarded as highly "aerobic" conditions). The aeration system of the air flow control system makes it possible to control the supply of air to the heap over and above the air flow that penetrates the heap via natural convection and into sections of the heap. In addition, the air impermeable barrier of the air flow control system makes it possible to prevent air flow into (and from) the heap altogether at least via the sides of the heap, which are usually the major exposed surface area for air flow into the heap. At the very least, the air impermeable barrier makes it possible to minimise air flow into (and from) the heap to a level that is not significant in terms of having an impact on the level of oxygen in the heap. As a consequence, the combination of the aeration system and the air impermeable barrier of the air flow control system can be used to control the air flow, particularly the oxygen level, in the heap during the course of a heap leach operation.

In any given situation, the extent of the coverage of the air impermeable barrier is a function of the aeration requirements of the heap. The aeration requirements may be different in different sections of the heap and at different times during the operational life of the heap. There may be situations where it is appropriate that the air impermeable barrier cover the whole of the exposed surfaces of the heap of the material, i.e. the sides and the top of the heap. There may be other situations in which it is appropriate that the air impermeable barrier cover only a part of the heap. For example, it may be appropriate that a lower section of the sides of the heap be covered and the top of the heap and an upper section of the sides of the heap be uncovered.

In addition, in any given situation it may be appropriate to control the permeability of sections of the heap that are "uncovered", i.e. do not have the air impermeable barrier. This may be achieved by the use of a barrier that provides a selected permeability for air flow into and from the heap.

The heap may be any suitable size and shape. By way of example, the heap may be elongate with a pair of parallel longer sides and a pair of parallel shorter sides (which may be described as "ends").

The material may be a sulphidic ore containing a valuable metal.

The sulphidic ore may be a sulphidic copper-containing ore that includes copper-containing minerals.

The air impermeable barrier may be positioned on or form part of at least 50% of the exposed surface area of the heap.

The air impermeable barrier may be positioned on or form part of at least 60% of the exposed surface area of the heap.

The air impermeable barrier may at least partly comprise compacted and/or chemically bound material in the sides of the heap.

Alternatively, or in addition, the air impermeable barrier may be separate to the material of the heap and be positioned on the sides of the heap.

The air impermeable barrier may be a combination of both of the above-described options.

The air impermeable barrier of the present invention is not confined to these options.

When the air impermeable barrier is separate to the material of the heap, the barrier may comprise a layer of an air impermeable material, with the thickness of the layer and/or the characteristics of the material being such that the layer of the material forms the air impermeable barrier.

The air impermeable material may be any suitable material.

By way of example, the air impermeable material may be a polymeric material, such as a reinforced polypropylene. Materials that are suitable air impermeable materials are sometimes referred to as "geomembrane" materials.

The layer of the air impermeable material may comprise a plurality of sheets of the air impermeable material positioned in side-by-side relationship along the length of the sides of the heap, with the sheets being secured at least to the top of the heap and to the ground adjacent a base of the heap.

The sheets may be secured to the heap by positioning upper and lower end sections of the sheets in trenches that are in the top and adjacent the base of the heap and extend along the length of the sides of the heap proximate the sides and then filling the trenches to cover the sections of the sheets in the trenches.

The sheets may be further secured to the top and the base of the heap by positioning a berm of the material that forms the heap (or another suitable material) on the sections of the sheets that extend between the anchor trenches and the sides of the heap.

The sheets may be positioned in side-by-side overlapping relationship.

The sheets may be joined together along the overlap of adjacent sheets.

By way of example, in the case of sheets of air impermeable polymeric material, the sheets may be welded together.

The air impermeable barrier may also comprise a layer of a puncture-proof material positioned between the heap and the layer of the air impermeable material.

The puncture-proof material may be any suitable material.

By way of example, the puncture-proof material may be a polymeric material. Materials that are suitable puncture-proof materials are sometimes referred to as "geotextile" materials.

The layer of the puncture-proof material may comprise a plurality of sheets of a suitable material positioned in side-by-side relationship along the length of the sides of the heap, with the sheets being secured at least to the top of the heap and to the ground adjacent a base of the heap.

The air impermeable barrier may comprise a plurality of prefabricated panels, with each panel comprising a sheet of the air impermeable material and a sheet of the puncture-proof material connected together.

The air impermeable barrier may include vents in the sheets or the panels to equalise pressure above and below the sheets or the panels.

The vents may be one way vents that allow air flow from the heap via the vents and prevent air flow into the heap via the vents.

The air impermeable barrier may include ballast positioned on sections of the sheets or the panels that cover the sides of the heap to assist in maintaining the sheets or the panels in place on the heap.

The aeration system may be adapted to supply air to the heap under natural convection or forced air flow conditions.

The aeration system may comprise a plurality of aeration pipes within the heap.

The aeration pipes may be any suitable pipes.

Typically, the aeration pipes include openings in the pipes at spaced intervals along the length of the pipes.

The aeration pipes may be arranged to supply air to the heap so that there are substantially uniform air, particularly oxygen, levels throughout the heap.

The aeration pipes may be in a lower section of the heap.

The aeration pipes may be at multiple levels of the height of the heap.

The aeration pipes may extend outwardly beyond the sides of the heap and include inlet ends externally of the heap.

The aeration pipes may extend outwardly through the air impermeable barrier and include inlet ends externally of the heap.

When the aeration pipes extend outwardly through the barrier, a seal may be provided to minimise or prevent altogether air flow into the heap via the locations at which the aeration pipes pass through the air impermeable barrier.

The aeration system may comprise a cover for closing the inlet end of each aeration pipe.

The aeration system may comprise a valve for closing each aeration pipe.

The valve may be a flow control valve to make it possible to vary the flow rate of air into the heap via each aeration pipe.

By way of example, the valve may be a butterfly valve positioned in the inlet end of each aeration pipe.

The aeration system may comprise a blower or other system positioned externally of the heap for supplying a forced flow of air to the heap via the aeration pipes.

The heap may comprise a system for supplying a leach liquor to the heap for leaching the valuable metal from the material in the heap.

The leach liquor supply system may comprise a system for supplying the leach liquor uniformly across the top of the heap.

The leach liquor supply system may be any suitable system.

The heap may comprise a system for draining a pregnant leach solution that contains the valuable metal leached from the material in the heap from the heap.

The pregnant leach solution drainage system may comprise a plurality of drainage pipes extending outwardly beyond the sides of the heap.

The pregnant leach solution drainage system may comprise a system for preventing flow of air into the heap via the drainage system.

The air flow prevention system may comprise a weir assembly positioned at an outlet end of the drainage pipe, with the weir assembly containing a volume of leach liquor drained from the heap via the drainage pipe, and the drainage pipe opening into the weir assembly below the level of the leach liquor in the weir assembly. This arrangement prevents air flow into the drainage pipe.

The weir assembly may comprise an opening to enable access to the leach liquor in the assembly to enable convenient sampling and flow rate measurement of leach liquor.

The present invention also provides a method of constructing a heap of a material for leaching a valuable metal from the material that comprises the steps of:

(a) forming the heap with sides and a top and aeration pipes that extend into the heap to supply air to the heap, a liquor supply system to supply liquor to the top of the heap, and a drainage system to drain a pregnant leach solution containing the valuable metal in solution from the heap;

(b) positioning and then connecting other components of an aeration system to the aeration pipes to supply air to the heap under natural convection or forced air flow conditions as may be required during a heap leaching operation; and (c) positioning an air impermeable barrier on at least the sides of the heap as required during the course of the heap leaching operation to minimise or prevent altogether air flow into the heap via the sides.

It may be the case that initial stages of the heap leaching operation do not require any limitation to air flow into the heap and, therefore, the air impermeable barrier may be positioned at a later stage in the heap leaching operation. Equally, it may be the case that the air impermeable barrier is positioned prior to the commencement of the heap leaching operation and the aeration system is used to control the supply of air into the heap.

Step (c) of the method may comprise providing a layer of an air impermeable material as the air impermeable barrier.

The layer of the air impermeable material may comprise a series of sheets of a suitable air impermeable material and step (c) may comprise positioning the sheets in side-by-side relationship along the length of the sides of the heap and securing the sheets at least to the top of the heap and to the ground adjacent a base of the heap.

Step (c) may comprise positioning upper and lower end sections of the sheets of the air impermeable material in trenches that are in the top and adjacent the base of the heap and extend along the length of the sides of the heap proximate the sides and then back-filling the trenches to cover the sections of the sheets in the trenches with the material removed from the heap to form the trenches.

Step (c) may comprise further securing the sheets of the air impermeable material to the top and the base of the heap by positioning a berm of the material of the heap on the sections of the sheets that extend between the anchor trenches and the sides of the heap Step (c) of the method may comprise joining together, for example by welding, adjacent sheets of the air impermeable material.

Step (c) of the method may also comprise providing a layer of a puncture-proof material between the heap and the layer of the air impermeable material.

The layer of the puncture-proof material may comprise a plurality of sheets of a suitable material and step (c) may comprise positioning the sheets in side-by-side relationship along the length of the sides of the heap and securing the sheets at least to the top of the heap and to the ground adjacent a base of the heap.

The air impermeable barrier may comprise a plurality of prefabricated panels, with each panel comprising a sheet of the air impermeable material and a sheet of the puncture-proof material connected together, and step (c) may comprise positioning the panels in side-by-side relationship along the length of the sides of the heap and securing the panels at least to the top of the heap and to the ground adjacent a base of the heap.

The method may also comprise forming a second lift of the material on the heap, with the second lift having sides and a top.

Forming the second lift on the heap comprises removing the liquor supply system for the first lift and re-positioning the liquor supply system or installing a new liquor supply system to supply leach liquor to the top of the second lift.

Forming the second lift on the heap may comprise positioning aeration pipes to extend into the second lift to supply air to the material in the second lift.

Forming the second lift on the heap may comprise positioning an air impermeable barrier on at least the sides of the second lift to minimise or prevent altogether air flow into the heap via the sides of the second lift. The air impermeable barrier may be installed at the time of forming the second lift or at a later time.

The method may also comprise forming successive lifts of the material on the second lift, with each successive lift having sides and a top.

The present invention also provides a method of heap leaching a valuable metal from a material that comprises the steps of supplying a leach liquor to a heap of the material to leach the valuable metal from the material and controlling air flow into the heap during the course of the method.

The heap may comprise (a) an air impermeable barrier on at least the sides of the heap to minimise or prevent altogether air flow into the heap via the sides and (b) an aeration system to supply air to the heap under natural convection or forced air flow conditions, and the method may comprise controlling air flow into the heap during the course of the method via the aeration system.

The method may comprise varying the air flow into the heap via the aeration system during different stages of the method.

The air flow requirements may vary between low flow rates (which could be regarded as anaerobic conditions) and high flow rates (which could be regarded as highly aerobic conditions).

The method may comprise using the same composition of the leach liquor during the course of the method and varying the aeration conditions in the heap to achieve required conditions in the heap.

Alternatively, the method may comprise varying the composition of the leach liquor during the course of the method to achieve required conditions in the heap and optionally varying the aeration conditions in the heap to achieve required conditions in the heap.

The method may comprise a further step of forming a second lift of the material on the above-described heap when the method has leached the material in the existing heap to a threshold level and repeating the above-described steps.

The method may comprise forming a plurality of lifts successively on the second lift when the method has leached the material in the existing heap to the threshold level and supplying the leach liquor to each successive lift and controlling air flow into the heap during the course of the method.

The method may comprise collecting a pregnant leach solution that contains the valuable metal leached from the material and recovering the valuable metal from the pregnant leach solution.

The material may be a sulphidic ore containing a valuable metal.

The sulphidic ore may be a sulphidic copper-containing ore that includes copper-containing minerals.

The present invention is described further with reference to the accompanying drawings, of which.

The present invention is based on modelling and pilot plant work carried out by a group company of the applicant that has shown that an air flow control system that comprises a combination of (a) an air impermeable barrier positioned on the sides of a heap of a material in the form of a sulphidic copper-containing ore and (b) an aeration system to supply air to the heap as required during the course of a heap leaching operation, is an effective means of controlling air flow into a heap.

In particular, it was found that it was possible to construct an effective air impermeable barrier on the sides of a heap and that this made it possible to control air flow into the heap via the aeration system.

The applicant believes that such air flow control is an important issue for a number of heap leaching operations.

Specifically, the applicant believes that, in many situations, successful operation of a heap leaching operation of a material such as a sulphidic copper-containing ore requires careful management of the chemical reactions within a heap during the course of the leaching operation. There are a number of factors that have an impact on the chemical reactions. These factors include, by way of example, heap temperature, acid concentration in leach solutions, iron species in leach solutions, oxygen levels in the heap, physical characteristics of the ore in the heap and the heap itself. The applicant also believes that varying the air flow into a heap between flow rates that make the conditions in the heap highly aerobic and flow rates that are low, with the conditions being effectively or bordering on anaerobic conditions, is an important factor in the chemistry control in a heap.

The potential importance of oxygen levels in heaps and, more particularly operating a heap leaching method under oxidising and reducing conditions and the impact of ferrous and ferric levels and total iron levels in heaps of sulphidic copper-containing ores is disclosed in International publications WO 03/038137 and WO 2009/000037 in the name of the applicant and the disclosure in these International publications is incorporated herein by cross-reference.

It is relevant to note that the oxidation of sulphidic material, such as sulphidic iron and/or copper-containing ores, under aerobic conditions is an exothermic process that generates a substantial amount of heat. In heap leaching operations, this heat can lead to natural convection, whereby oxygen is drawn into the heap, resulting in further oxidation and enhanced generation of heat. Hence, successful operation of a heap leaching method that includes a step of leaching under low air flow rate conditions requires minimal ingress of oxygen, and hence convection should be precluded during this step. The group company of the applicant has found that this variation in conditions during the course of a heap leaching operation, which requires air flow control, is particularly important for leaching chalcopyrite.

The following description is in the context of heap leaching a sulphidic copper-containing ore. It is emphasised that the present invention is not confined to this type of ore and extends more generally to any material that includes a valuable metal.

The heap shown in the Figures is a standard form in terms of the basic shape and size of the heap and insofar as the heap comprises mined ore that has been processed, for example by being crushed and screened, in accordance with standard practice for forming heaps. More specifically, the present invention does not extend to the particular shape and size of the heap and does not extend to the physical characteristics of the ore. In addition, more specifically, the present invention also extends to heaps of previously discarded material from mining operations.

The heap shown in the Figures is basically elongate with a pair of parallel inclined longer sides and a pair of parallel inclined shorter sides (which may be described as "ends") that extend around the entire perimeter of the heap, and with a generally flat top.

Figure 1:
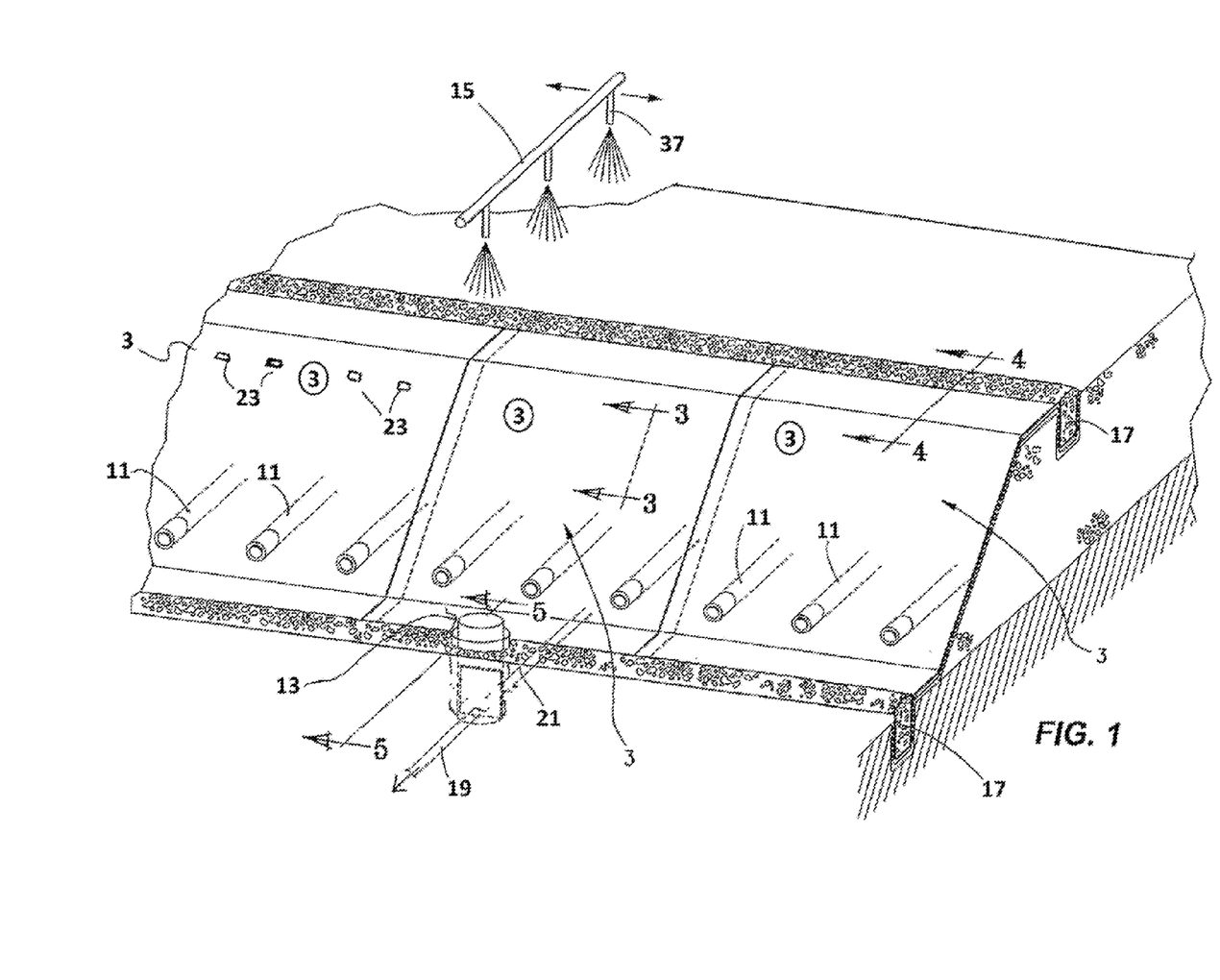
FIG. 1 is a perspective view of one embodiment of a single lift heap of a material in accordance with the present invention, which shows a plurality of prefabricated panels that form an air impermeable barrier on the side of the heap, with each panel comprising a sheet of an air impermeable polymeric material and an underlay of a sheet of a puncture-proof material.
Figure 2A:
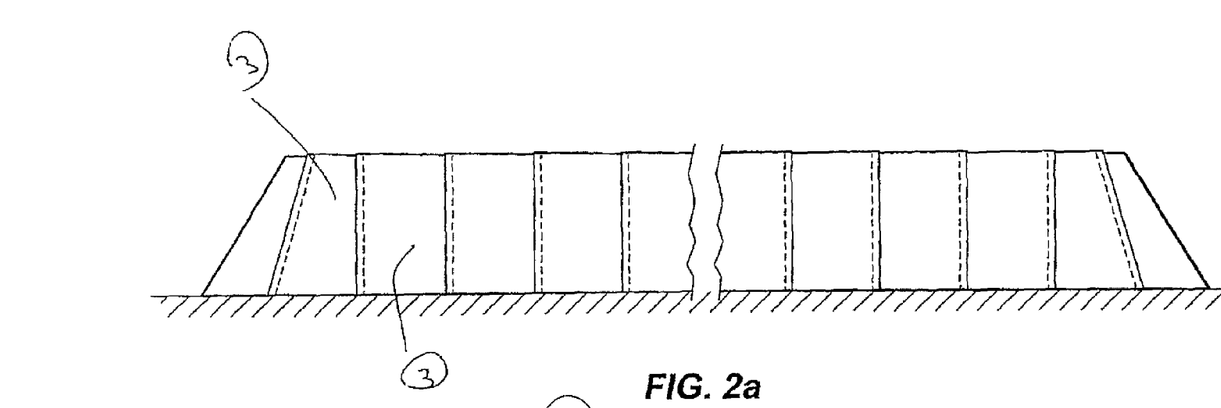
FIG. 2a is a simplified diagram of the side of the heap shown in FIG. 1.

FIGS. 1 and 2a show a single lift heap.

With reference to the FIG. 1, the heap of the sulphidic copper-containing ore includes:

(a) an air impermeable barrier in the form of a plurality of prefabricated panels 3 positioned on the sides of the heap to exclude air flow through the sides, with each panel 3 comprising an outer sheet 7 of an air impermeable polymeric material (more particularly a geomembrane material) and an inner sheet 9 of a puncture-proof material (more particularly a geotextile material), (b) vents 23 in upper sections of the panels 3 to equalise pressure above and below the sheets or the panels (vents 23 are shown in one panel 3 only in FIG. 1 to simplify the drawing);

(c) an aeration system to allow controlled air flow into the heap as required during the course of a heap leaching operation;

(d) a system for supplying a leach liquor to the top of the heap so that the leach liquor can flow downwardly through the heap and leach copper from the ore; and (e) a system for discharging a pregnant leach solution that contains copper in solution that has been leached from the ore from the heap in a way that prevents flow of air into the heap via the discharge system.

Figure 4:
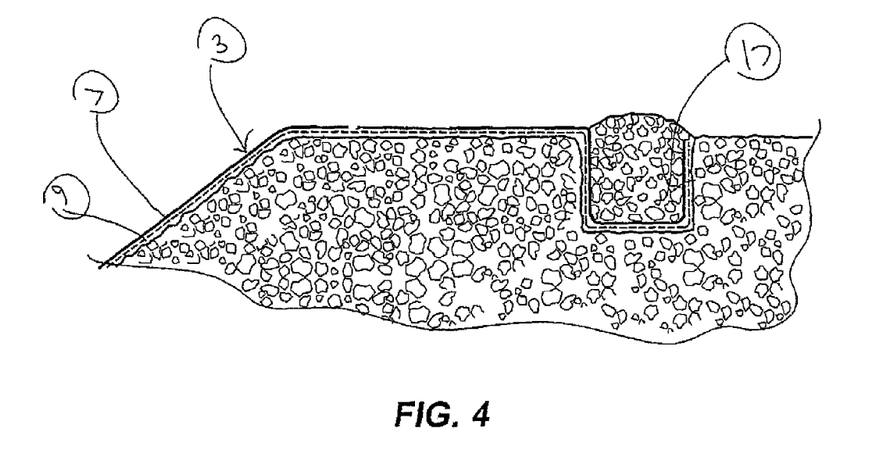
FIG. 4 is a cross-section along the line 4-4 in FIG. 1, which shows how an upper end of one of the panels is anchored to the top of the heap.

With reference to FIGS. 1 and 4, the upper and lower ends of the panels 3 are secured to the heap by positioning the ends into trenches 17 extending along the length of the heap and then back-filling the trenches with the material removed from the heap to form the trenches.

The air impermeable panels 3 and the aeration system control air flow into the heap. The air impermeable panels 3 cover the sides of the heap and the sides amount to a substantial part of the surface area of the heap that was previously exposed for air flow into the heap. More particularly, the combination of the air impermeable panels 3 and the aeration system make it possible to control air flow, particularly oxygen level, in the heap during the course of a heap leach operation so that the conditions in the heap can vary between "aerobic" and "anaerobic" conditions. The panels 3 may be any suitable length and width dimensions, thickness and weight having regard to factors such as the materials handling requirements for positioning the panels 3 on the heap.

With reference to FIG. 1, the aeration system comprises a plurality of aeration pipes 11 that extend horizontally through openings in the panels 3 into the heap. The pipes 11 are positioned near the base of the heap. The number and the location of the pipes 11 may be selected as required for a particular ore to be leached and the requirements of the heap leach operation for the ore. The pipes 11 may be of any suitable configuration. Typically, the pipes 11 comprise a series of openings (not shown) at spaced intervals along the length of the pipes 11. The aeration system may be arranged to supply air to the heap under natural convection or forced air flow conditions. The aeration system also comprises a series of blowers (not shown) connected to the inlets of the pipes 11 to supply air under forced air flow conditions. The aeration system also comprises flow control valves (not shown) in the pipes 11 to control air flow into the heap via the pipes 11. As is indicated above, there may be situations where there is a need to prevent air flow altogether into the heap. Consistent with the objective to control air flow into the heap, the entry locations of the pipes 11 through the panels 3 are sealed to prevent air flow through any gaps between the panels and the pipes.

With reference to FIG. 1, the liquor supply system comprises a header pipe 15 that extends transversely across the exposed top surface of the heap and a plurality of downwardly directed outlet nozzles 37 at spaced intervals along the length of the pipe for supplying a leach liquor to the heap. The header pipe 15 may be supported on a runner assembly (not shown) that makes it possible to move the header pipe 15 along the length of the heap in both directions indicated by the arrows in FIG. 1 so that leach liquor can be supplied to the whole exposed surface of the top of the heap. The liquor supply system also comprises leach liquor storage ponds (not shown) and a pipework (not shown) that connects the ponds to the header pipe 15 to supply leach liquor to the pipe and the nozzles.

The liquor supply system 5 may be any other suitable system. The most common liquor supply system is a drip emitter system comprising a header pipe connected to a network of flexible tubing (or emitter lines) containing nozzles (or emitters) at specified intervals to deliver an even distribution of liquor to the surface of the heap.

The liquor discharge system collects pregnant leach solution ("PLS") from the base of the heap and transfers the PLS to a plurality of outlet weir assemblies 13, only one of which is shown in the Figures located adjacent the sides of the heap. The weir assemblies 13 enable the flow of PLS from various sections of the heap to be measured and to prevent air flow back into the heap via the discharge system. Each weir assembly discharges PLS via a pipe 19 to a collection pond (not shown). PLS is supplied to each weir assembly via a pipe 21 from the collection system in the heap. This collection system may be any standard system.

Figure 5:
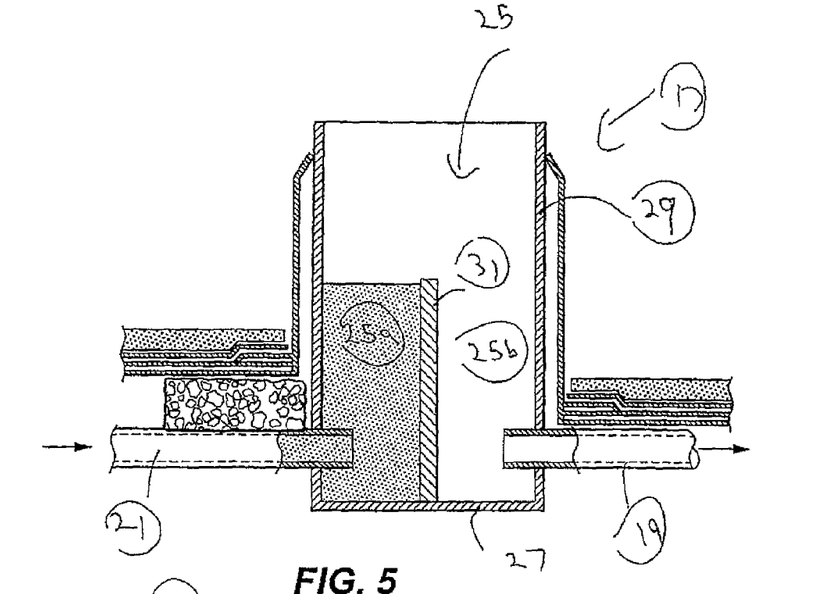
FIG. 5 is a cross-section along the line 5-5 in FIG. 1, which shows a system that prevents air flow into the heap via a liquor discharge pipe.
Figure 6:
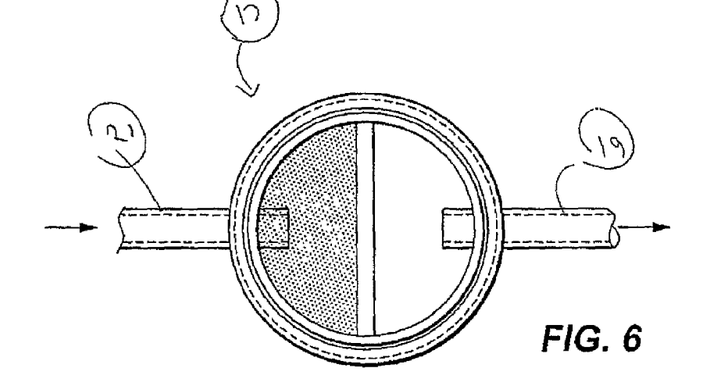
FIG. 6 is a top plan view in the direction of the arrow "X" in FIG. 5.

With reference to FIGS. 5 and 6, each weir assembly comprises a cylindrical chamber 25 that has a base wall 27 and a cylindrical side wall 29 and an open upper end to allow access to the chamber. A cover (not shown) is provided to close the opening. Each weir assembly also comprises a weir 31 that divides a lower part of the chamber 25 into two compartments 25a and 25b. The pipe 21 supplies PLS from the heap into the compartment 25a and the pipe 19 extends from the compartment 25b to supply PLS to the collection pond (not shown). The height of the weir 31 is selected to be above the height of the pipe 24. As a consequence, the PLS flowing into the compartment 25a builds up in the compartment 25a until the level reaches the top of the weir 31, at which point the liquor can overflow into the compartment 25b and flow to the collection pond via the pipe 19. As well as enabling the flow rate to be measured, it can be appreciated that this arrangement maintains a volume of PLS in the compartment 25a that covers the pipe 21 and thereby prevents flow of air into the heap via the pipe 21.

Figure 7:
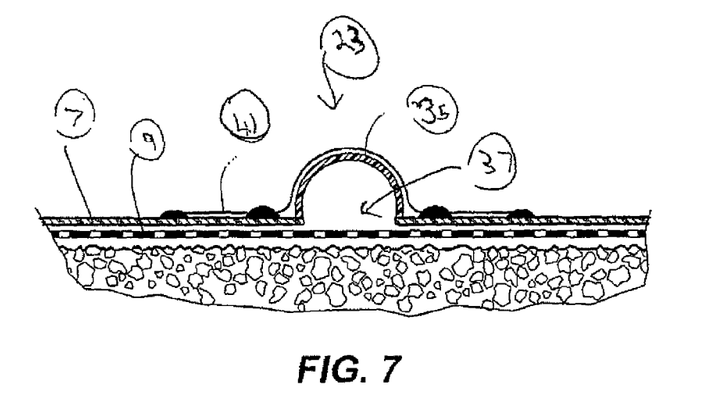
FIG. 7 is a cross-section of a vent hole in one of the sections of the panels.

With reference to FIG. 7, the Figure is a cross-section that shows one of the vents 23. These vents 23 are provided in the panels 3, typically in upper sections of the panels 3, to equalise pressure above and below the panels 3. Each vent 23 comprises a short length of an open-ended half-cylindrical tube 35 of a rigid material that is positioned over an opening 37 in the geomembrane material 7 of a panel 3 and is held in that position by a strip 41 of a polymeric material that is positioned to extend over the tube and is welded to the geomembrane material 7. It can be appreciated that air can flow from the space between the panel 3 and the heap into the tube 35 and from the tube via the open ends of the tubes. There may be any suitable number of these vents 23 in the panels 3. The vents 23 can act as "one-way" valves enabling air (or other gases) to escape from the heap. Specifically, the vents 23 enable air to escape as panels 3 are being laid on the sides of the heap. In addition, if air gets into the heap through, for example, a hole in the panels 3, the vents allow this air to escape and thereby avoid a build up of pressure that could lift large sections of the panels 3, causing the panels to tear. In addition, at times when the heap is being aerated in a controlled manner, with air being supplied into the heap, the vents 23 provide an opportunity for the air to escape from the heap. In addition, invariably there will be other gases generated from chemical reactions in the heap that need to be released somehow (e.g. $CO_2$). Hence, the vents 23 are useful in "aerobic" or "anaerobic" modes to protect the physical integrity of the air impermeable barrier.

Figure 2B:
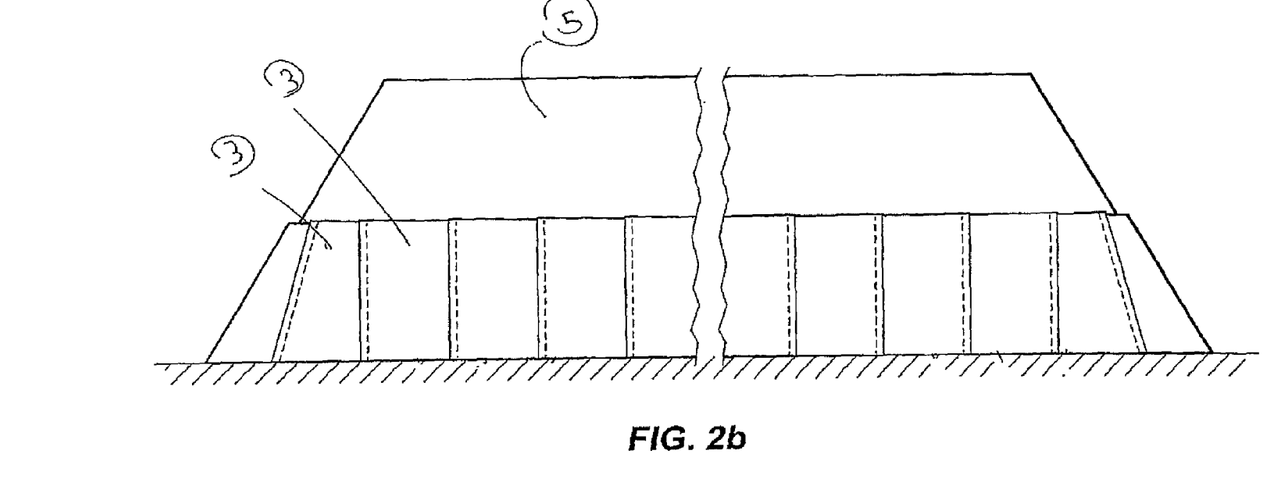
FIG. 2b is simplified diagram of the side of the heap shown in FIG. 1 with a second lift positioned on the original single lift.
Figure 3:
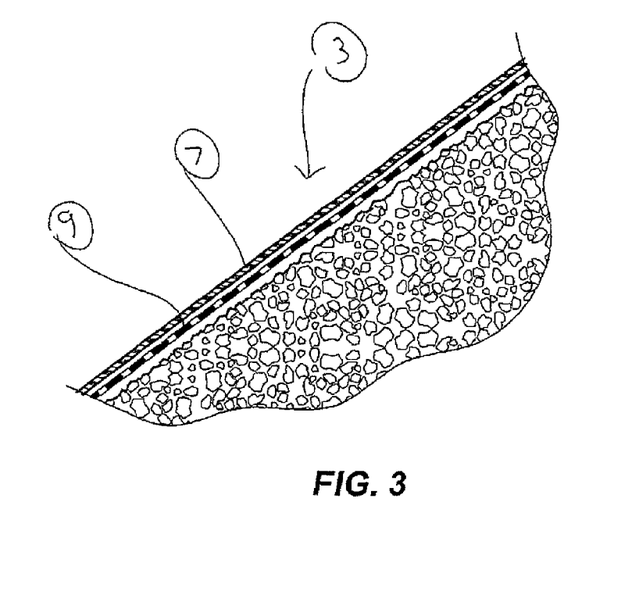
FIG. 3 is a cross-section along the line 3-3 in FIG. 1, which shows in more detail one of the panels on the side of the heap.

FIG. 2b shows a second ore lift 5 positioned on the heap shown in FIGS. 1 and 2a, i.e. a single lift heap. The second lift 5 in FIG. 2b does not include an air impermeable barrier as shown in FIGS. 1 and 2a. A barrier could be positioned at a later stage in a heap leaching method in accordance with the present invention. In addition, FIG. 2b does not show an aeration system for the second lift 5 and a system for suppling a leach liquor to the top of the second lift. These systems would be similar to the systems described in relation to the single lift heap and would be installed at the time of constructing the second lift and would be operated during the course of a heap leaching method on the heap. It is note that it may not be necessary in all instances to include the aeration system in the second lift. It is noted that the heap may comprise more than two lifts. In that event, the method of constructing the second lift could be repeated for each successive lift.

As is indicated above, a group company of the applicant carried our research and development work on heap leaching sulphidic copper-containing ores and the present invention is an outcome of the findings of this work. The work included operating a test heap of a sulphidic copper-containing ore.

The test heap was an existing heap at a mine and the heap was provided with the above-described air impermeable barrier with vents, aeration system, leach liquor supply system and leach liquor discharge system.

The panels 3 were delivered to the site of the test heap in an accordion-folded form in a lengthwise direction of the panels 3 and then rolled onto a spine. The following steps were used to deploy each panel 3.

The top edge of the panel 3 was anchored using a vehicle and then the panel was rolled down the slope, ensuring that the area below was clear of equipment and crew.

The accordion-folded panels were then unfolded across the sloping sides of the heap. This was done by attaching the lower and upper corners of the panel 3 to a back hoe and bobcat. The panels 3 were then manhandled as required to remove any unwanted folds or creases.

The panel 3 was anchored at the toe and crest of the slope using anchor trenches 17, located proximate the toe or crest. The panel 3 was laid in the trenches and covered with fill material. At the crest, a safety berm was provided after all of the panels were secured and at the toe, road access was returned.

Overlapping panels 3 were trimmed to allow for an overlap. A welder unit was used to heat and roll-compress the panels 3 together to create a seam. The seam integrity was then tested using an air lance. Any non-conformity was repaired manually and re-tested.

A stainless steel cable was attached to a concrete beam inserted into the crest anchor trench and laid down the slope. Ballast tubes were then attached to this cable (two at a time) using Crosby clamps and quick link fittings. The two joined ballast tubes were connected by two quick links through grommet holes in the end of the each ballast tube.

The test work carried out by the group company of the applicant established that:
(a) the above-described panels were an effective air impermeable barrier,
(b) the above-described method of installing the panels 3 on the heap worked well, and
(c) the combination of the air impermeable barrier and the aeration system made it possible to control the conditions in the heap.

Many modifications may be made to the embodiment of the present invention described above without departing from the spirit and scope of the invention.

By way of example, whilst the embodiment of the heap described in relation to the drawings comprises an air impermeable barrier in the form of a plurality of panels 3 made from sheets of a geomembrane material and a geotextile material, the present invention is not so limited and extends to the construction of the barrier from any suitable materials and in any suitable configuration and is not confined to structures in the form of panels.

In particular, it is noted that the barrier is not confined to a barrier that is positioned on the heap and extends to barriers of compacted material on the sides of the heap that prevent air flow through the sides. Such compacted material may be formed from the material of the heap itself.

In addition, such compacted material may be sized to help reduce permeability.

In addition, binders and the like may be added as required to such compacted material.

By way of example, whilst the embodiment of the heap described in relation to the drawings comprises an air impermeable barrier that substantially covers the sides of the heap (which in the case of an elongate heap includes what is often described as the "ends" of the heap), the present invention extends to other arrangements in which there may be more or less coverage of the heap by the air impermeable barrier. In some situations, the objective of controlling air flow into a heap may be met by providing a less extensive coverage of a heap with the air impermeable barrier. For example, it may only be necessary to partially cover the sides of the heap. In other situations, greater coverage of the heap may be required and, for example, it may be necessary to cover the top of the heap.

The invention claimed is:

1. A heap of a material to be leached to recover a valuable metal from the material, the heap comprising sides and a top and an air flow control system configured to control air flow into the heap, the air flow control system comprising:
(a) an air impermeable barrier that is separate to the material of the heap and is positioned on the sides of the heap to minimize or prevent altogether air flow into the heap through the sides, the air impermeable barrier comprising (i) a layer of an air impermeable material, with the thickness of the layer and/or the characteristics of the material being such that the layer of the material forms the air impermeable barrier, and (ii) a layer of a puncture-proof material positioned between the heap and the layer of the air impermeable material; and
(b) an aeration system configured to supply air to the heap as required during the course of a heap leaching operation.

2. The heap defined in claim 1 wherein the air impermeable barrier further comprises prefabricated panels of a sheet of the air impermeable material and a sheet of the puncture-proof material connected together.

3. The heap defined in claim 1 wherein the aeration system comprises a plurality of aeration pipes within the heap.

4. The heap defined in claim 3 wherein the aeration pipes extend outwardly through the air impermeable barrier and include inlet ends externally of the heap.

5. The heap defined in claim 4 further comprising a seal to minimize or prevent altogether air flow into the heap via the locations at which the aeration pipes pass through the air impermeable barrier.

6. The heap defined in claim 4 wherein the aeration system further comprises a flow control valve to make it possible to vary the flow rate of air into the heap via each aeration pipe.

7. The heap defined in claim 1 further comprising a pregnant leach solution drainage system configured for draining a pregnant leach solution that contains the valuable metal leached from the material from the heap, and the pregnant leach solution drainage system comprises a plurality of drainage pipes extending outwardly beyond the sides of the heap.

8. The heap defined in claim 7 wherein the pregnant leach solution drainage system further comprises an air flow prevention system configured for preventing flow of air into the heap via the drainage system.

9. The heap defined in claim 8 wherein the air flow prevention system comprises a weir assembly positioned at an outlet end of the drainage pipe, with the weir assembly containing a volume of leach liquor drained from the heap via the drainage pipe, and the drainage pipe opening into the weir assembly below the level of the leach liquor in the weir assembly.

10. A heap of a material to be leached to recover a valuable metal from the material, the heap comprising sides and a top and an air flow control system configured to control air flow into the heap, the air flow control system comprising:
(a) an air impermeable barrier positioned on or forming a part of at least the sides of the heap to minimize or prevent altogether air flow into the heap through the sides, and
(b) an aeration system configured to supply air to the heap as required during the course of a heap leaching operation, the aeration system comprising a plurality of aeration pipes within the heap that extend outwardly through the air impermeable barrier and include inlet ends externally of the heap.

11. The heap defined in claim 10 further comprising a seal to minimize or prevent altogether air flow into the heap via the locations at which the aeration pipes pass through the air impermeable barrier.

12. The heap defined in claim 10 wherein the aeration system further comprises a flow control valve to make it possible to vary the flow rate of air into the heap via each aeration pipe.

13. The heap defined in claim 10, wherein the air impermeable barrier comprises compacted and/or chemically bound material in the sides of the heap.

14. The heap defined in claim 10, wherein the air impermeable barrier is separate to the material of the heap and is positioned on the sides of the heap.

15. The heap defined in claim 14 wherein the air impermeable barrier comprises a layer of an air impermeable material, with the thickness of the layer and/or the characteristics of the material being such that the layer of the material forms the air impermeable barrier.

16. The heap defined in claim 15 wherein the air impermeable barrier further comprises a layer of a puncture-proof material positioned between the heap and the layer of the air impermeable material.

17. The heap defined in claim 16 wherein the air impermeable barrier further comprises prefabricated panels of a sheet of the air impermeable material and a sheet of the puncture-proof material connected together.

18. The heap defined in claim 10 further comprising a pregnant leach solution drainage system configured for draining a pregnant leach solution that contains the valuable metal leached from the material from the heap, and the pregnant leach solution drainage system comprises a plurality of drainage pipes extending outwardly beyond the sides of the heap.

19. The heap defined in claim 18 wherein the pregnant leach solution drainage system further comprises an air flow prevention system configured for preventing flow of air into the heap via the drainage system.

20. The heap defined in claim 19 wherein the air flow prevention system comprises a weir assembly positioned at an outlet end of the drainage pipe, with the weir assembly containing a volume of leach liquor drained from the heap via the drainage pipe, and the drainage pipe opening into the weir assembly below the level of the leach liquor in the weir assembly.

21. A heap of a material to be leached to recover a valuable metal from the material, the heap comprising sides and a top and an air flow control system configured to control air flow into the heap, the air flow control system comprising:
  (a) an air impermeable barrier positioned on or forming a part of at least the sides of the heap to minimize or prevent altogether air flow into the heap through the sides;
  (b) an aeration system configured to supply air to the heap as required during the course of a heap leaching operation; and
  (c) a pregnant leach solution drainage system configured for draining a pregnant leach solution that contains the valuable metal leached from the material from the heap, and the pregnant leach solution drainage system comprises a plurality of drainage pipes extending outwardly beyond the sides of the heap.

22. The heap defined in claim 21 wherein the air impermeable barrier comprises compacted and/or chemically bound material in the sides of the heap.

23. The heap defined in claim 21 wherein the air impermeable barrier is separate to the material of the heap and is positioned on the sides of the heap.

24. The heap defined in claim 23 wherein the air impermeable barrier comprises a layer of an air impermeable material, with the thickness of the layer and/or the characteristics of the material being such that the layer of the material forms the air impermeable barrier.

25. The heap defined in claim 24 wherein the air impermeable barrier further comprises a layer of a puncture-proof material positioned between the heap and the layer of the air impermeable material.

26. The heap defined in claim 25 wherein the air impermeable barrier further comprises prefabricated panels of a sheet of the air impermeable material and a sheet of the puncture-proof material connected together.

27. The heap defined in claim 21 wherein the aeration system comprises a plurality of aeration pipes within the heap.

28. The heap defined in claim 27 wherein the aeration pipes extend outwardly through the air impermeable barrier and include inlet ends externally of the heap.

29. The heap defined in claim 28 further comprising a seal to minimize or prevent altogether air flow into the heap via the locations at which the aeration pipes pass through the air impermeable barrier.

30. The heap defined in claim 28 wherein the aeration system further comprises a flow control valve to make it possible to vary the flow rate of air into the heap via each aeration pipe.

* * * * *